(12) United States Patent
 Colling

(10) Patent No.: US 10,950,075 B2
(45) Date of Patent: Mar. 16, 2021

(54) ELECTRICAL SECURITY SOCKET

(71) Applicant: SECURIPLUG LTD, Woodstock (GB)

(72) Inventor: Simon Colling, Oxfordshire (GB)

(73) Assignee: SECURIPLUG LTD, Woodstock (GB)

( * ) Notice: Subject to any disclaimer, the term of this patent is extended or adjusted under 35 U.S.C. 154(b) by 0 days.

(21) Appl. No.: 16/623,761

(22) PCT Filed: Jun. 26, 2018

(86) PCT No.: PCT/IB2018/054698
§ 371 (c)(1),
(2) Date: Dec. 17, 2019

(87) PCT Pub. No.: WO2019/003101
PCT Pub. Date: Jan. 3, 2019

(65) Prior Publication Data
US 2020/0134950 A1    Apr. 30, 2020

(30) Foreign Application Priority Data
Jun. 26, 2017  (GB) .................................... 1710131

(51) Int. Cl.
*G07C 9/00*       (2020.01)
*H01R 13/66*      (2006.01)
(Continued)

(52) U.S. Cl.
CPC ..... *G07C 9/00563* (2013.01); *H01R 13/6675* (2013.01); *H01R 13/6683* (2013.01);
(Continued)

(58) Field of Classification Search
CPC ............ G07C 9/00563; H01R 13/6675; H01R 13/6683; H01R 13/6691; H01R 13/70;
(Continued)

(56) References Cited

U.S. PATENT DOCUMENTS 8,335,936 B2 * 12/2012 Jonsson .............. H02J 13/0005
                                                     713/300
9,231,351 B2 *  1/2016 Chung ................. H01R 13/665
(Continued)

OTHER PUBLICATIONS

PCT International Search Report, PCT/IB2018/054698, dated Sep. 10, 2018.
(Continued)

*Primary Examiner* — Brian E Miller
(74) *Attorney, Agent, or Firm* — William H. Bollman

(57) ABSTRACT

This invention relates generally to security covers for electrical appliances which are powered by mains electricity. More specifically it relates to security covers to operate the electrical appliances by authorised users locally or remotely via an authorisation device via a network such as the internet. The security cover houses a switch and includes an authorisation device for enabling an authorised person to control a power supply, via the switch, to an electrical device or appliance. The security cover has an input means adapted to receive an authorisation signal; the switch is operative in response to the authorisation signal and a command signal in order to connect and disconnect the power supply to the device or appliance.

15 Claims, 7 Drawing Sheets

(51) Int. Cl.
  *H01R 13/639* (2006.01)
  *H02J 3/14* (2006.01)
  *H01R 13/70* (2006.01)
  *H01R 13/717* (2006.01)
(52) U.S. Cl.
  CPC ......... *H01R 13/6691* (2013.01); *H01R 13/70* (2013.01); *H01R 13/7175* (2013.01); *H02J 3/14* (2013.01); *H01R 13/6397* (2013.01)
(58) Field of Classification Search
  CPC ............ H01R 13/7175; H01R 13/6397; H01R 13/701; H01R 24/70; H01R 24/78; H01R 25/006; H01R 31/065; H02J 3/14; H02J 2310/14; H02J 2310/12; Y02B 90/20; Y02B 70/3225; Y02B 70/30; Y04S 20/242; Y04S 20/222; Y04S 20/00; G06K 9/00087; G06K 9/00288; G06K 9/00885; G06K 9/00006
  See application file for complete search history.

(56) References Cited

U.S. PATENT DOCUMENTS

| | | | |
|---|---|---|---|
| 9,742,128 B2* | 8/2017 | Justice | H01R 13/6683 |
| 9,836,069 B1* | 12/2017 | Nelmes | G05B 15/02 |
| 9,892,630 B1* | 2/2018 | Strods | H04W 4/70 |
| 10,050,441 B2* | 8/2018 | Chapel | H02J 13/00028 |
| 10,210,356 B2* | 2/2019 | Vechvittayakhlung | G06K 19/0723 |
| 10,616,742 B2* | 4/2020 | Tetreault | H04L 69/08 |
| 10,687,409 B2* | 6/2020 | Karc | H05B 47/105 |
| 2009/0192927 A1 | 7/2009 | Berg | |
| 2010/0264752 A1 | 10/2010 | Wong | |
| 2014/0265577 A1* | 9/2014 | Beckman | H02J 3/14 307/39 |
| 2015/0198938 A1* | 7/2015 | Steele | G05B 15/02 700/275 |
| 2015/0256665 A1* | 9/2015 | Pera | H04M 1/72533 455/420 |
| 2017/0277239 A1* | 9/2017 | White | G06F 21/32 |
| 2017/0315767 A1* | 11/2017 | Rao | G06Q 30/06 |
| 2018/0004927 A1* | 1/2018 | Lowe | G06F 21/34 |
| 2020/0053689 A1* | 2/2020 | McQueen | H04W 12/06 |

OTHER PUBLICATIONS

PCT Notification of Transmittal of the International Search Report and the Written Opinion of the International Searching Authority, PCT/IB2018/054698, dated Sep. 19, 2018.

* cited by examiner

ELECTRICAL SECURITY SOCKET

FIELD OF THE INVENTION

This invention relates generally to an electrical plug and socket security covers, for example for use with electrical appliances, which are powered by AC electric power. More specifically the invention relates to plug and socket security covers to enable them to operate electrical appliances via a network such as the Internet.

BACKGROUND

Most homes, offices, factories and workshops have electrical appliances which were manufactured before the advent of the Internet. These appliances cannot be conveniently integrated into systems using the Internet to monitor and to control appliances or devices.

PRIOR ART

People have already recognised the need to be able to monitor and control so called legacy electrical appliances using modern networks, such as the Internet or local area networks.

CN 106025726 (Wei, Xue) discloses a security cover plug. The plug is plugged into the security cover plug which includes a wireless network communication means.

Lock box devices exist for use with appliance plugs to prevent children or others from accidents with electrical appliances or too much use of appliances such as game consoles.

U.S. Pat. No. 9,039,524 (DiCarlo, Rioux) discloses a lock box device for controlling access to entertainment systems.

GB 2310323 (Laverick, Wakelin) discloses a secure programmable usage controller for electrical appliances U.S. Pat. No. 5,731,763 (Herweck et al) discloses an access controller with a wireless transmitter and receiving unit.

CN 206076639 (Li) discloses an intelligence TV lock switch.

The invention solves several problems that are encountered with many of the prior art devices.

SUMMARY OF THE INVENTION

According to a first aspect of the invention there is provided a security cover housing a switch and includes an authorization device for enabling an authorised person to control a power supply, via the switch, to an electrical device or appliance, has an input means to an authorization device which outputs a local authorization signal which when authenticated configures the switch in an operative state, so that the power supply is able to be connected to, and disconnected from, the device or appliance in response to a command signal.

The security cover may be included in an electrical plug, the security cover may surround and enclose an electrical plug, the security cover may include or comprise a socket or may be a cover plate for a power supply. In this way the security cover takes different forms depending upon the connection to the power supply. It is appreciated that the term 'security cover' or 'cover' is intended to represent all the before mentioned embodiments.

In this way a plurality of covers may be deployed in a system which includes a control and a display and so that covers can be configured for use with various power supply devices. Advantageously the security cover enables a switch associated with the cover to be switched locally or remotely.

In some embodiments the security cover includes an override device provided for overriding the command signal so that a permission signal is required from a supervisor in order to configure the switch in its operative state.

The override device may be automatically or manually activated.

Alternatively an override device may be provided to enable a local input to an authorization device, by an authorised user, to override a command signal so as to enable the power supply to be connected or disconnected.

The security cover may include an identification means which identify the cover in a network; and a communication means which is operative to relay an identity signal from the identification means to a remote location.

The communication means may comprise a wireless device, such as a short range communication device, for example Bluetooth® or Zigbee® or a similar device, is operative to identify the identity of the cover in a network. Alternatively the communication means may comprise a hardwired device that is able to transmit the identity of the cover via a power line.

In this way access to the power supply is controlled by authorised users. So that, for example, only authorised staff or management or parents, are able to grant access to a power supply for one or more selected devices and appliances. When used in combination with a system including multiple covers, the power supply to each cover may be deployed remotely to prevent vulnerable users, such as elderly or disabled persons, from connecting or disconnecting a power supply when they are not supervised.

When the security cover is configured as a part of a network, the cover enables connection to smart devices, such as mobile phones (smartphones), tablets, computers or other electronic devices by the communications means that may for example enable communication via a Wi-Fi connection.

In some embodiments the cover may be fitted with a local timer which enables power supplies to only be activated for pre-set periods of time. The timer function may allow parents to set and automatically monitor and control the time children spend on gaming consoles or watching television. The timer function may permit use of certain equipment at certain times to encourage or maintain routines and to reduce energy consumption. For example, kitchen equipment may only be used at eating times such as pre-set breakfast, lunch and dinner times, or cleaning equipment in hotels may only be permitted after checkout time for rooms.

In some embodiments the timer may be remote from the cover, for example on a smartphone, tablet or computer so that an authorization signal is issued via the network to the security cover at a pre-set time or for a pre-set period of time.

The override device may be used to override automatic or pre-set usage times.

Optionally the authorization device may be used as a manual override device so that, for example, a designated or authorised user can override a timer and switch a power supply on or off when needed. For example an override device may enable a local input means to an authorization device, by an authorised user, to override automatic or pre-set usage times.

In this configuration it is appreciated that the cover can be used to protect children from using dangerous household devices, such as a food blender, without supervision, as the appliance can only be switched on when an adult who has authorization is present.

In a preferred embodiment the cover is an enclosure which surrounds a plug so that only a cable emerges therefrom, the enclosure is fitted with tines or pins for insertion into a socket. In this embodiment the plug, when connected to a socket, is controllable to connect or disconnect to a power supply.

Preferably the enclosure is lockable by means of a lock to prevent access within the enclosure and thereby interference of the power supply by an unauthorized Ideally the enclosure houses the identification means which enables the identity of the enclosure (cover) to be discovered by way of the network. The communication means is operative to relay an identity signal from the cover to a remote user which enables the user to connect or disconnect an appliance that is connected to the power supply associated with the cover. As mentioned above this may be achieved via a wireless network or via power cables that provide electricity to the device.

A command signal arising as a consequence of an input from an authorised user, or a command signal in combination with authorization signal, switches the switch to connect or disconnect to/from a power supply.

Therefore in some embodiments the command signal and the authorization signal do not have to be generated in the same security cover.

Preferably the security cover has an on/off indicator that indicates that an authorization device has been operated by an authorised user. For example, the on/off indicator may be provided on the housing of a lockable enclosure and may include a visual and/or an audible alert.

Preferably the on/off indicator is a light emitting diode (LED) arranged on the housing or arranged to shine through a security cover or lockable enclosure.

Preferably the indicator is a device arranged to cooperate with the communication means to send the user, via the network, an indication that the authorization device has authorised the user and turned the switch on or off.

The on/off indicator may be configured to indicate if the user is not an authorised person.

Preferably a local override device is operable to connect and disconnect a power supply, for example by means of the plug to/from the tines, only when the user is an authorised user.

The security cover has an authorization device that may include, but is not limited to, a biometric identifier such as a fingerprint sensor or facial recognition imager, a key fob, a card.

The authorization device, such as fingerprint sensor or scanner provides an authorization signal on receipt of an input means such as a finger touching a touch surface of the fingerprint sensor on an exterior portion of the security cover.

In some embodiments the biometric feature identifier may comprise a voice identifier and detector comprising a microphone to detect sound through an opening in the security cover.

In yet a further embodiment the authorization device includes a keypad on the security cover and authorises the local user only when identified by a code typed in on the keypad.

Preferably a local override device may comprise an electronic means, such as a biometric device or a near field communications (NFC) device operating an override means.

The override device may include a Bluetooth® proximity recognition mechanism for a paired electronic device or key.

The security cover that encloses a plug is like that of a standard plug with the electrical cable of the plug trailing out of the lockable enclosure.

It is envisaged that a standard plug could be readily modified with the addition of the enclosure. Therefore the enclosure is suitable for retrofitting to a standard plug.

Advantageously the electrical cable of the appliance with the electrical plug security cover has the same versatility to reach from the plug to an electrical recess in a wall, floor, ceiling, or extension electrical cable, as the electrical cable has without the electrical plug security cover.

Advantageously an appliance with its plug secured within the security cover is enabled to be switched on or off by a user's device in communication with a network (to which the cover is connected) when the user's device has an identification code and the authorization code, associated with the authorised user, or authorised device such as a fob or smartcard. The appliance is also enabled to be switched on or off directly by a user who uses the authorization device such as the fingerprint reader, voice identifier, other biometric feature identifier, or a keypad.

Communication via the network can enable one or more electric supplies to be switched on an off in response to one command signal from an authorised user.

Advantageously this enables a plurality of appliances to be switched on and off together or in specific groups via a remote device in communication with the network. For example the network options may be programmed/selected remotely through an application on a smartphone or tablet or controlled by means of a computer connected to the network. Alternatively the security cover may be programmed locally via the authorization device, for example pressing and holding the touch surface of the fingerprint sensor may put the authorization device in a programming mode.

In this way it may be possible to authorise different users to permit or enable them to access different power supplies and thereby different appliances.

In embodiments of the system including a lockable enclosure, preferably the local override device additionally or alternatively serves to lock and unlock the lockable enclosure for entry and removal of the plug from the security cover only when the user is authorised.

For example, a fingerprint reader may be arranged to lock and unlock the lockable enclosure for entry and removal of the plug from the security cover. Advantageously, a person with a fingerprint recognisable via the fingerprint reader can secure and remove the plug.

In some embodiments it may be possible for a remote device to read a fingerprint, therefore removing the need of a local fingerprint reader device, for example by way of a smart phone with fingerprint recognition capabilities and by use of an authorization signal transmitted via the network, optionally as an encrypted signal.

Preferably the electrical plug may be released by operation of the override device, for example with use of the biometric feature identifier such as the fingerprint reader, to unlock the lockable enclosure. Advantageously a parent or other overseer who has programmed the fingerprint to recognise their fingerprint can prevent a child or another from releasing the plug and plugging the plug directly into a plug recess/socket to operate an appliance.

In some embodiments the fingerprint reader is only programmable to recognise a fingerprint by use of an authorization code.

Preferably a communication means relays the command signal to the switch only when the user is authorised. A user may authorise the communication means to relay the command signal so that another user may operate the switch through a network via the communication means. Advantageously the other user may only use the appliance when authorised to do so by a user with a superior level of control or authorization.

In this way a command signal may be activated by a local user at a first security cover and this may activate a power supply at a second security cover for a second user.

In yet a further embodiment a security cover may operate under dual authorization in which on detection of a command signal an authorised user activates the authorization device if a user is approved.

In a yet further embodiment a local user is only enabled to operate an appliance with the authorization of a superior user who may be local or remote.

Preferably the lockable enclosure has a child thwarting unlocking means. Examples include mechanisms which require a button to be depressed before the enclosure is opened and before pulling it apart.

Additionally or alternatively the security cover may include a key lock to prevent unauthorised access to the cover, for example removal of the cover.

For example the lockable enclosure of a plug may have a key lock. Advantageously the plug can be secured and removed from the plug security cover by anyone with a key for the key lock. Preferably a key slot in the lock passes through a surface in the security cover which encloses a wall mounted socket so that the cover can be fitted to and removed from a socket.

Advantageously the cover may be configured so that the key cannot be inserted into the slot while the plug security cover tines are plugged into the wall electricity recess and in contact with AC electric power. A user is thereby isolated from a mains supply when holding the key and so is prevented from receiving an electric shock when attempting to insert the key into the slot in this configuration.

Preferably the security cover comprises a power converter for converting AC electric power, received from the power supply, to a desired voltage, current, and frequency for powering the authorization device; identification means; and the communication means. Advantageously the security cover operates using AC electric power and no batteries are required.

Preferably the security cover has a memory to store authorization data such as codes, images, sounds or biometric data of the local user and/or usage data of the security cover. For example authorization data may be stored as a library of permitted users, or usage data may be recorded as a log to record operation of the switch and details of user to include authorised user details and unauthorised user attempts.

Ideally the memory can receive authorization data as well as other data via the network, such that authorization data (for example biometric data of a fingerprint or voice) can be stored permanently.

A plurality of the security covers may receive authorization data from one device on the network. Therefore an otherwise painstaking task of inputting user authorization data individually, for example from a fingerprint scanner, to several security covers in different locations, is avoided and user authorization data can be transmitted to each memory on each security cover before the system is for the first time.

Preferably the network communication means is arranged to communicate with the network by transmitting and receiving signals from the security cover. This mode of communication may include: via tines or pins of a plug or via the power supply, or via a wireless communication network.

Advantageously the network provides power for operating the memory, network communication means, switch operator and a fingerprint reader. Furthermore, a wired electrical connection, such as a plug has an advantage of closed circuit network security.

Preferably the security cover comprises a light projecting light observable when in use, to indicate the communication means is in communication with a network. Advantageously the user has no doubt that the plug security cover is in communication with the network or not in communication with the network.

Preferably the security cover is formed from synthetic plastics. Advantageously a synthetic plastic cover is inexpensive to manufacture in large quantities. The synthetic plastics material is an electrical insulator and protects user from electrical shock since the plug of the appliance in the socket is surrounded by the polymeric material.

Preferably the lockable closure comprises the synthetic plastics material unit and a closure plate to cover the plug when entrapped in the lockable enclosure. Advantageously the moulded polymeric unit and the closure plate form the enclosure with the plug inside merely by plugging the plug into the socket and then attaching the cover plate over the opposite of the plug from the tines.

Preferably the closure plate is fixed to an electrical circuit comprising the communication means, switch, local override device, and authorization means, and preferably a scanner circuit for the fingerprint reader, and an electrical contact to the moulded polymeric unit. A printed circuit board which is inexpensive to produce in large quantities comprises these components and is easily fixed in the cover plate or attached to a substantially planar side of the closure plate.

Preferably the synthetic plastics material unit is fixed to an electrical circuit comprising the communication means, switch, local override device, and electrical circuit portion of the authorization means. Advantageously a contact to a circuit board separated from the polymeric unit in which the plug is inserted is not required as these electrical components are all in the same synthetic plastics material unit.

Preferably the electrical plug security cover comprises a battery to provide power to the communication means, switch operator, local override device, and authorization means.

In some embodiments the electrical plug security cover is arranged to store details about usage, for example so that a parent can monitor how much time, and at what times, the child is using the device.

Preferably the security cover has anti tamper means to prevent malicious attempts to gain use of the power supply associated with the security cover or selection of security covers. For example, forceful removeable of the security cover may disable the switch.

According to another aspect of the invention, there is provided a method of operating an electrical appliance comprising a security cover including the steps of: inserting a plug, connected to the electrical appliance into a socket; switching on a switch if present at the socket; authorising the security cover; and switching on the electrical appliance.

For a security cover comprising an enclosure for a plug a method of operating an electrical appliance including the steps of inserting the plug of the electrical appliance into a lockable enclosure; entrapping the plug in the lockable enclosure; communicating with the electrical plug security cover via the communicator; inserting the plug, connected to the electrical appliance into a socket; switching on a switch if present at the socket; authorising the security cover; and switching on the electrical appliance.

The method may include steps to unlock the lockable enclosure with the local override device and removing the plug from the security cover only when the user is authorised. Preferably the method includes relaying the command signal with the communication means to the switch only when the user is authorised.

The invention will now be described, by way of example only, with reference to the accompanying drawings in which:

DETAILED DESCRIPTION OF THE INVENTION

Figure 1A:
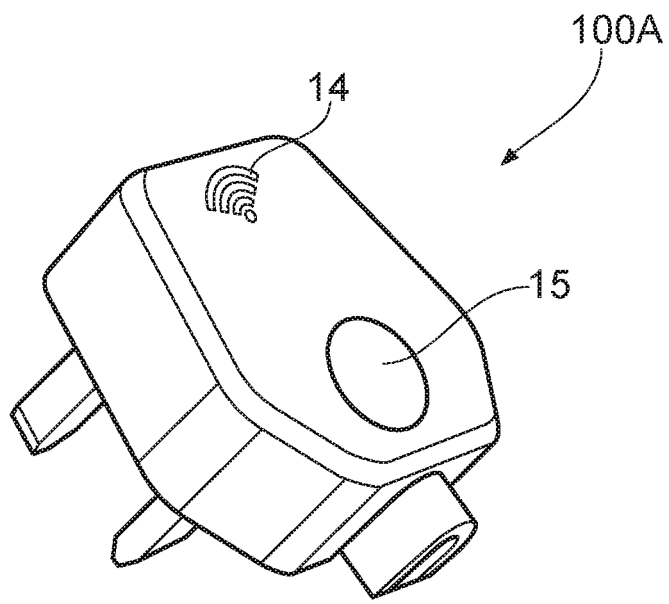
FIG. 1A shows a security cover in the form of a plug.
Figure 1B:
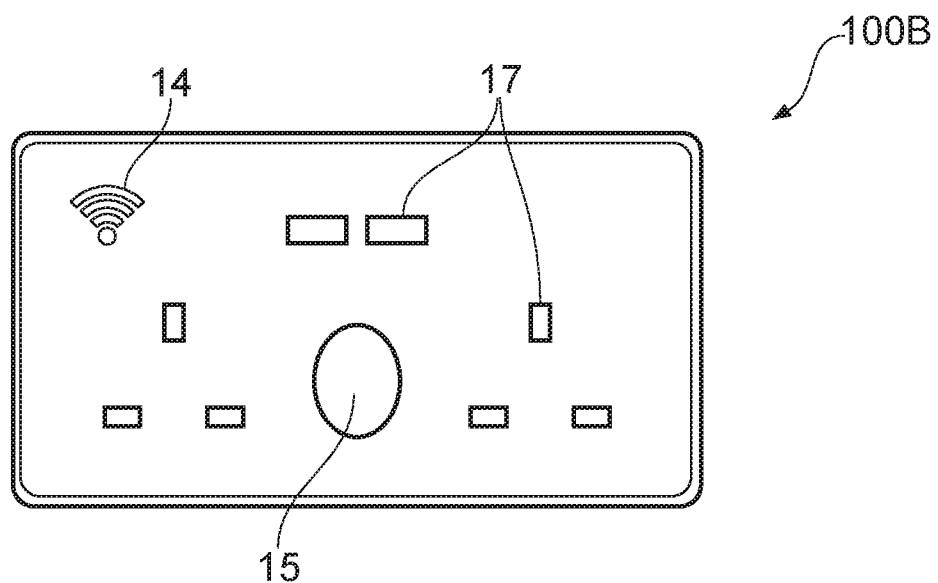
FIG. 1B shows security cover in the form of a socket.
Figure 2:
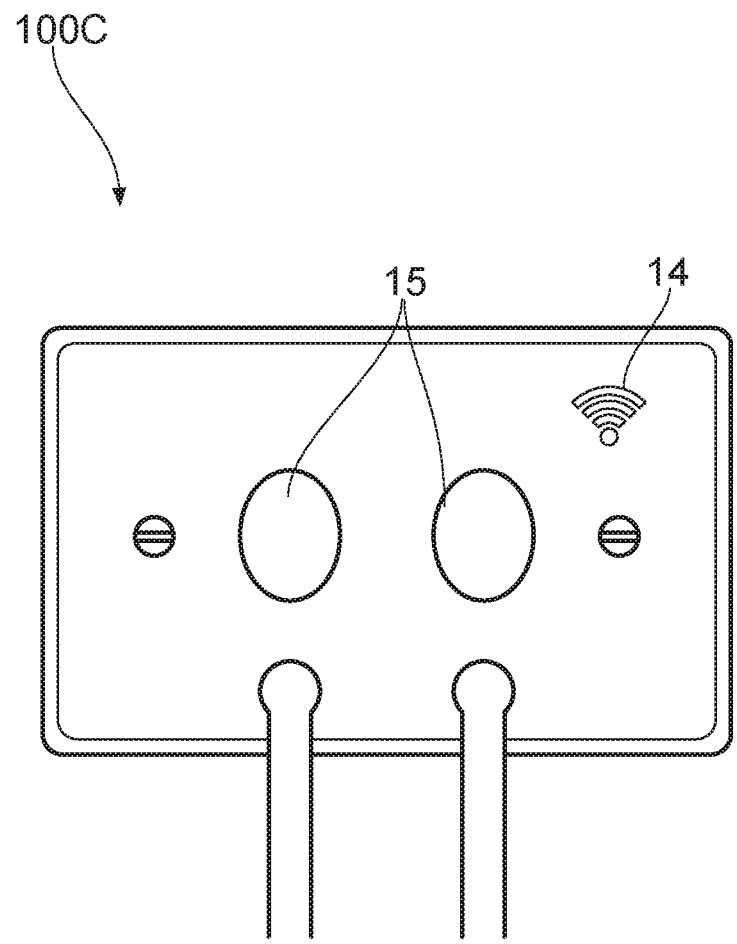
FIG. 2 shows a security cover for a hardwired device.
Figure 3:
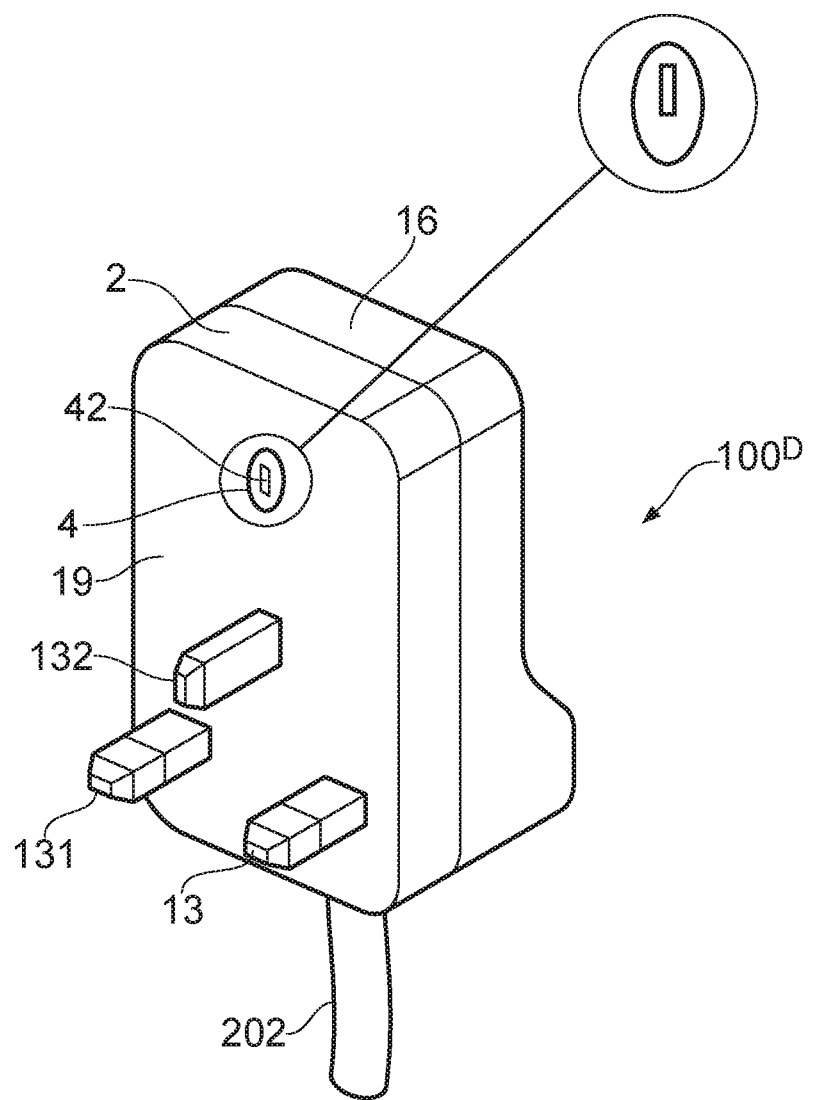
FIG. 3 is a perspective view of a security cover for a plug in the form of an enclosure encasing a plug.
Figure 4:
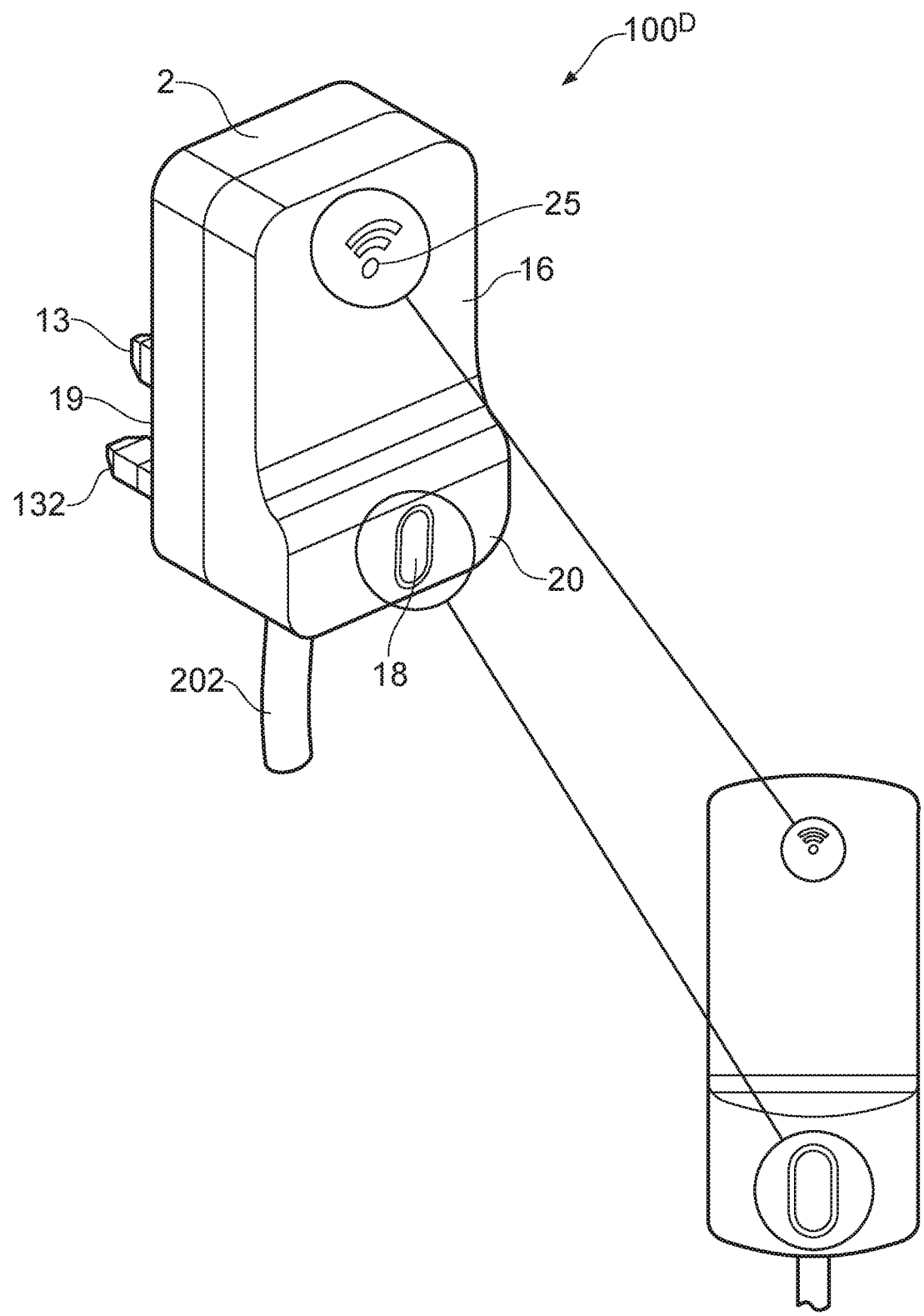
FIG. 4 is a perspective view of the enclosure and plug shown in FIG. 3.
Figure 5:
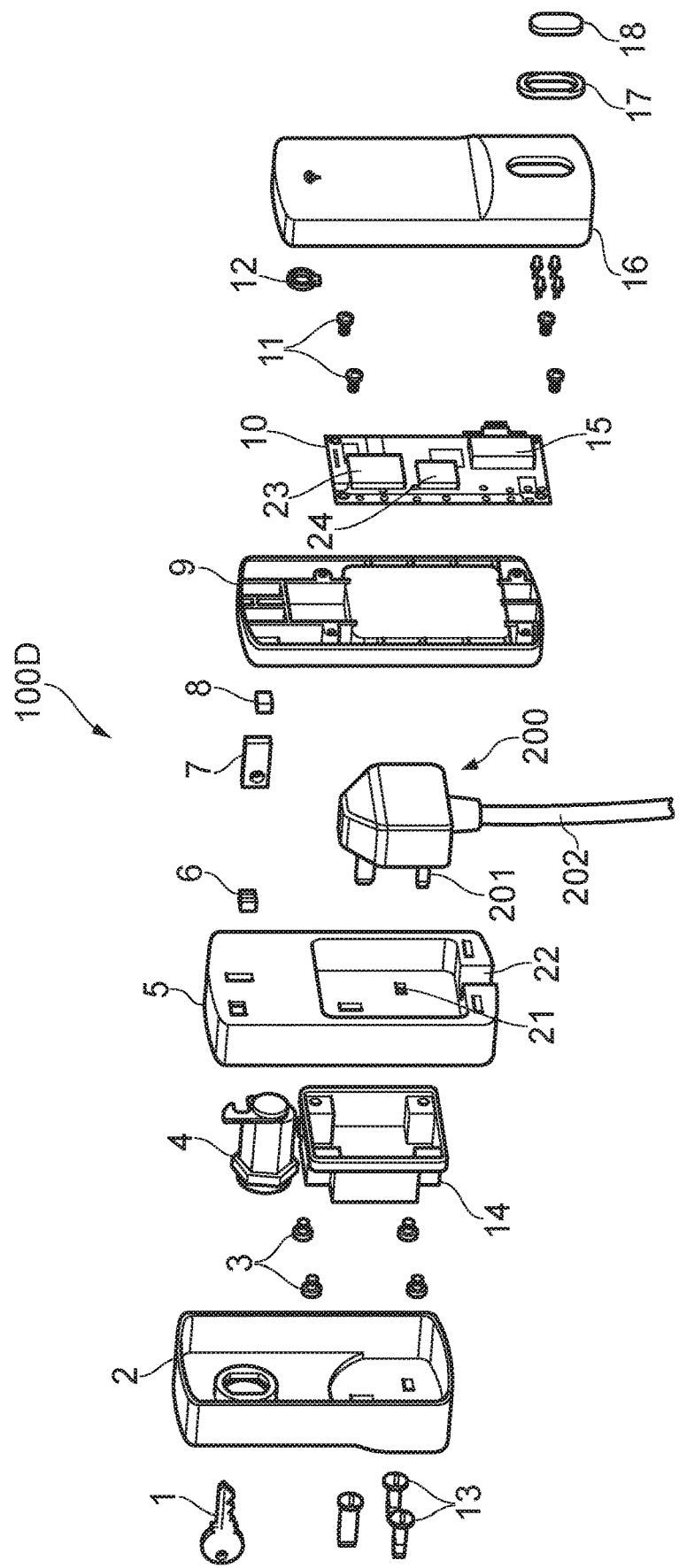
FIG. 5 is an exploded view of an enclosure and plug.

Referring to the Figures, FIGS. 1 to 5 show variations of a security cover 100A, 100B, 100C, 100D in the form an electrical plug (FIG. 1A), socket (FIG. 1B), cover (FIG. 2) and an enclosure (FIGS. 3 to 5).

Each security cover 100 houses a switch 6 (FIG. 5) and includes an authorization device 15 (such as a fingerprint identifier, facial recognition device, key fob or card) for enabling an authorised person to control a power supply, via the switch 6, to an electrical device or appliance.

The security cover 100 has an input means adapted to receive an authorization signal from the authorization device 15.

An identification means identifies the cover 100 in a network (See FIG. 6); and a communication means 23 which is operative to relay an identity signal from the security cover 100 to a remote location (such as to a smartphone).

The switch 6 is operative in response to the authorization signal and a command signal in order to connect and disconnect the power supply to the device or appliance. A local override device is provided for overriding the command signal so that an authorization signal is required in order to connect or disconnect the device or appliance.

FIG. 1A discloses a security cover for a plug 100A with an authorization device 15 in the form of a fingerprint scanner provided on an outer face of the plug. The outer face of the plug 100 also has a light 14 to indicate a wireless connection with the network. In this way a user can view a visual alert, in the form of a light, that indicates that an identification signal is being transmitted through the network.

The light is a light emitting diode in the shape of a Wi-Fi image.

FIG. 1B discloses a security cover 100B with an array of sockets 17. An authorization device 15 in the form of a scanner is provided on an outer face of the security cover.

The outer face of the security cover 100 also has a light 14 to indicate a wireless connection with the network. In this way a user can view a visual alert, in the form of a light, that indicates that an identification signal is being transmitted through the network.

FIG. 2 discloses a security cover in the form of a plate 100C covering a power supply. The plate 100C may be arranged over a hardwired connection or may be a cover plate over a box containing plugs connected to sockets. In either embodiment the power supply is controlled by the plate 100C.

The security cover plate 100C has two authorization devices 15 and a light 14.

The security cover 100D of FIGS. 3 to 5 is an enclosure 5 for an electrical plug 200. The enclosure 100D has an electrical socket 21 in the enclosure 5 to receive the plug 200. An aperture 22 is formed in a wall of the enclosure 5 into the socket through which an electrical cable 202 passes. The cable 202 extends from the plug 200 to an appliance. The appliance is not shown.

When received in the socket 21, a switch 6 electrically connected intermediate the socket and electrical tines 13, 131, 132 on the exterior of the electrical plug security cover, a wireless network communication means 23, a memory 24 comprising an identification code to identify the security cover on the network and an authorization code, and a switch operator to open and close the switch 6 on receiving the authorization code and an open and a close command through the network communication means 23, a fingerprint reader 15 comprising a touch surface 18 on an exterior portion 20 of the plug security cover accessible while the tines 13, 131, 132 of the plug security cover are plugged in to a wall electricity recess, wherein the fingerprint reader 15 is arranged to override the communication means to open and close the switch.

The electrical plug security cover 100D in FIGS. 3 and 4 is enclosing an electrical plug 200 and the electrical wire 202 of the plug tails from the aperture. The electrical plug security cover 100D when enclosed around the plug 200 is like that of the plug with the electrical cable of the plug trailing out of the aperture.

The lockable enclosure 5 is a moulded polymeric unit. The electrical socket 21 is formed in a side of the polymeric unit.

The tines 13, 131, 132 extend away from the moulded polymeric unit.

A key lock 4 extends through the lockable enclosure 5. The key lock extends to a surface 19 of the plug security cover which faces the wall of the wall electricity recess when the tines are plugged into the wall electricity recess. A slot for a key 42 into the key lock is a slot in the surface 19.

A key 1 cannot be inserted into the slot while the electrical plug security cover 100D is plugged into an electrical recess in a wall since the slot faces the wall and is covered by the casings 2, 16.

A printed circuit board 10 comprises the network communication means 23, the memory 24, and an electronic scanner 15. The electronic scanner communicates with the switch operator to open and close the switch successively as the scanner recognises a finger on the touch surface 18.

The printed circuit board 10 is attached to a closure plate 9 by screws 11 which pass through holes in the circuit board located at the corners of the printed circuit board.

The closure plate 9 has two sides. The printed circuit board is attached to one of the sides of the closure plate. The opposite side of the closure plate 9 is joined to the lockable closure 5 with the closure plate 9 covering the socket 21 to enclose the plug 200 inside the electrical plug security cover.

The aperture 22 is formed by a channel in the lockable closure 5 which extends from the exterior of the closure to the socket 21. The electrical cable 202 of the plug is easily put into the channel and covered by the closure plate when the closure plate is joined to the lockable closure 5.

The lockable closure 5 and cover plate 9 are held joined together by a front case 16 and a rear case 2. The front and rear case clip together to encase the lockable closure 5 and closure plate 9.

A locking pin 7 connected to closure plate 9 engages with the key lock 4 to hold the closure plate over the socket 21 and thereby lock the plug 200 into the socket 21.

In FIG. 5 which is an exploded view, the internal parts of the electrical plug security cover including the lock 4, printed circuit board 10, switch 6, lockable enclosure 5, and closure plate 9 can be seen. The electrical plug 200 can also be seen.

In FIGS. 3 and 4 which show the electrical plug security cover as ready for use, only the exterior of external parts including the front case 16, the rear case 2, and the tines 13, 131 and 132 can be seen.

The front case 16 comprises a surface which faces away from the wall of the electricity recess. On the surface which faces away there is a window 25 in bezel 12. The window 25 is arranged front of a light emitter on the printed circuit board 10 when the printed circuit board is attached to the closure plate 9 and encased by the front 16 case and rear case 2. Light from the light emitter is observable when the tines 13, 131, 132 of the electrical plug security cover are plugged into the wall electricity recess. The light emitter illuminates due to a signal from the wireless network communication means to indicate that the communication means is in communication with a remote device.

In use an electrical appliance attached to the opposite end of the electrical cable 202 as the plug 200 is operated with the electrical plug security cover. The electrical appliance is not shown in the Figures.

The electrical plug security cover 100D is operated by inserting the plug 201 of the electrical appliance into the socket 21 of the electrical plug security cover, communicating electrical plug security cover via the network communication means 23 and identifying the electrical plug security cover by the identification code. The electrical plug security cover continues to be operated by opening the switch 6 via a signal transmitted through the network to turn the electrical appliance off and closing the switch via a signal transmitted through the network to turn the appliance on.

The electrical plug security cover is further operated by plugging the tines of the security cover into the wall electricity recess to supply electricity to the communication means, switch operator, and fingerprint reader via the circuit connector 8.

Figure 6:
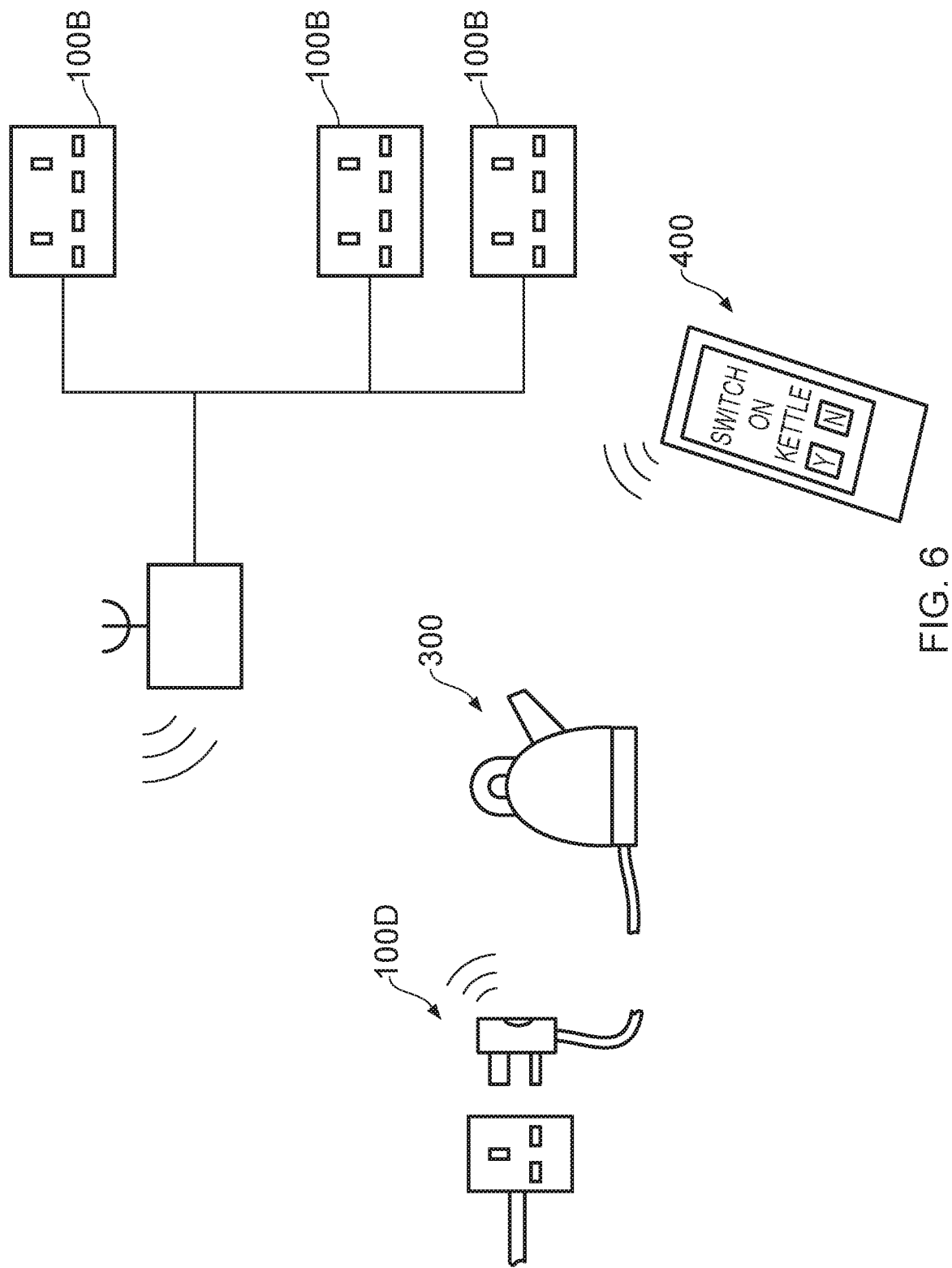
FIG. 6 shows a diagrammatical example of a network which includes an appliance.

FIG. 6 shows diagram representing the various methods of use of a security cover 100D. An appliance 300 (kettle) has a plug arranged in an enclosure 5. The plug and enclosure 5 connect to a wall socket.

The enclosure has an authorization device 15 so that the plug in the enclosures can be locally activated upon detection of a valid signal.

Alternatively a smartphone 400 could transmit an authorization signal to the security cover. For example fingerprint recognition on the smartphone 400 could be used to identify a user and transfer an authorised signal to the cover to activate the power supply.

The authorization signal is received by the input means and analysed to check it corresponds to an approved user. Typically the authorization signal generated by the authorization device is compared by a comparator with a list of identities stored in a library. The list may be stored locally in a memory in the device or remotely, for example on a database or on a portable handheld electronic device such as a smartphone or tablet.

Receipt of an authorization signal may also generate an identification signal to identify which cover has been activated in a network. The identification signal may be transmitted by a transmitter to a remote location with the authorization signal in order to indicate the identity of the device which is being configured (switched on or off) and by whom and this data, with the time and date may be recorded in a secure memory or on a database.

FIG. 6 also shows diagram representing the method of use of a security cover 100B. An appliance 300 (kettle) has a standard (non-enclosed) plug. The plug connects to the security cover 100B wall socket.

Alternatively one or more security covers 100B may receive authorization data from one device on the network.

Figure 7:
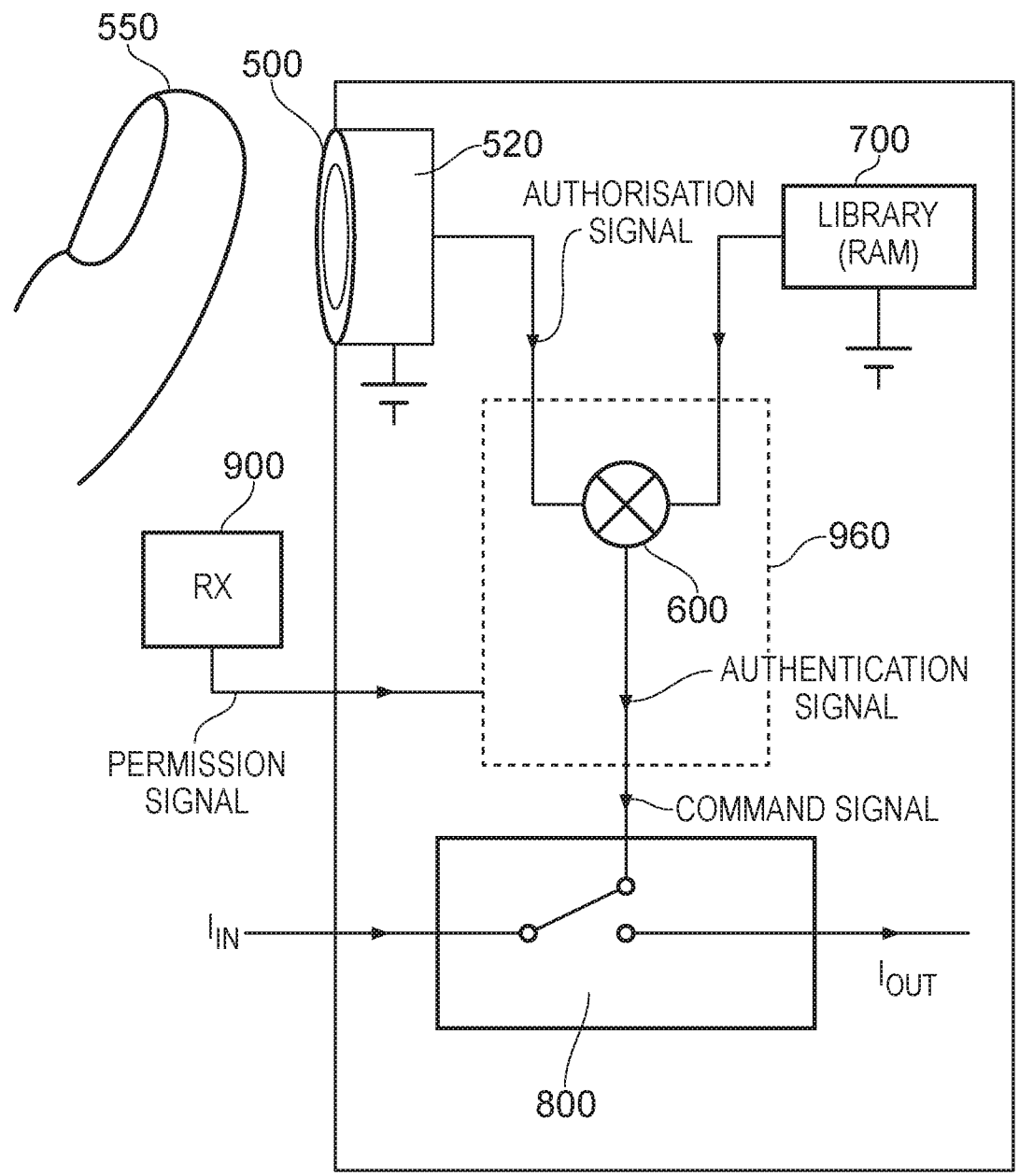
FIG. 7 shows in diagrammatical form a functional block diagram of one preferred embodiment of a plug.

FIG. 7 shows in diagrammatical form a functional block diagram of one preferred embodiment of a plug. A touch sensitive pad or key 500 includes transducer 520 which monitors changes in reflection of waves when a finger 550 touches the surface of the transducer 500. The transducer may be a capacitive touch device or a resistive touch device. Either capacitive touch device or a resistive touch device causes an authorization signal to be generated in response to pressure from finger 550. Alternatively a camera may be used which monitors changes in light levels and shades of grey.

The authorization signal is indicative of a biometric input, such as fingerprint from finger 550. The authorization signal is sent to a comparator 600 which compares the authorization signal indicative of finger 550 with a library of characteristics stored in a memory 700 in order to indicate a match. When the comparator 600 indicates a match an authentication signal is used to generate a command signal to switch 800 which enables input current ($I_{IN}$) to flow through switch 800 and flow as output current $I_{OUT}$ from the switch 800.

An override device 960 outputs a permission signal which overrides the command signal in the event that a supervisor (not shown) requires the switch 800 to be configured in an operative state or in an inoperative, for example in an emergency or at a prescribed time period or when a user or authorised person is no longer authorised. The permission signal may be received via a receiver 900, from a remote location, or the permission may be refused locally. The receiver 900 is optionally a short range wireless device, Bluetooth® device, which is operative to receive a permission signal granting permission or a permission signal refusing permission from a remote location. In an alternative embodiment the receiver may be configured to receive a permission signal via a hardwire connection such as an Internet connection or via AC electric power.

The invention has been described by way of examples only. Therefore, the foregoing is considered as illustrative only of the principles of the invention. Furthermore, since numerous modifications and changes will readily occur to those skilled in the art, the invention is not limited to the exact construction and operation shown and described.

Accordingly, all suitable modifications and equivalents may be resorted to, falling within the scope of the claims.

The invention claimed is:

1. A socket housing comprising:
    an electrical socket for securing a power plug to an electrical appliance therein,
    a switch connected to the electrical socket,
    an authorization device for enabling an authorized person to control a power supply, via the switch, to the electrical appliance securely plugged into the socket, the authorization device outputting a local authorization signal when authenticated to configure the switch into either an operative state where the power supply is able to be connected to the power plug to the electrical appliance, or an inoperative state where the power supply is able to be disconnected from the power plug to the electrical appliance, in response to a command signal, the authorization device including a biometric sensor,
    identification means for identifying the socket housing in a network,
    communication means operative to relay an identity signal identifying the socket housing to a remote location, and
    an override device to override the command signal so that a permission signal from the override device configures the switch to one of the operative state and the inoperative state,
    wherein the power plug is physically securable in the electrical socket such that the power plug can be unplugged from the electrical socket only when authorized,
wherein the power plug is physically securable in the electrical socket such that the power plug can be unplugged from the electrical socket only when authorized.

2. The socket according to claim 1 wherein:
    the communication means which is operative to relay the identity signal to a remote location.

3. The socket according to claim 1, wherein:
    the communication means is further operative to receive the permission signal from a short range wireless device.

4. The socket according to claim 1, wherein:
    the communication means which is further operative to receive the permission signal via at least one of an Internet connection and an AC power supply.

5. The socket according to claim 1 wherein:
    the socket has an on/off indicator that indicates that the authorization device has been authorized.

6. The socket according to claim 1 wherein:
    the socket has an on/off indicator that indicates when the switch is switched on to connect the power supply and when the switch is switched off to disconnect the power supply.

7. The socket according to claim 1 wherein:
    the biometric sensor is a fingerprint identifier.

8. The socket according to claim 1 wherein the biometric sensor comprises:
    a microphone and transducer for providing an authentication signal which is indicative of a voice pattern.

9. The socket according to claim 1, wherein the authorization device comprises:
    imaging means.

10. The socket according to claim 1 further comprising:
    a memory to store authorization data including at least one of codes, images, sounds or biometric data of a local user, and/or usage data.

11. The socket according to claim 1 further comprising:
    an indicator which indicates when the socket is in communication with a network.

12. The socket according to claim 1 further comprising:
    a timer.

13. The socket according to claim 1, further comprising:
    a controller which is located remotely and is operative to communicate with the socket.

14. The socket according to claim 1 wherein:
    the authorization device includes a lock.

15. The socket according to claim 12, further comprising:
    a local timer which enables the power supply to be connected to the electrical appliance for a pre-set period of time.

* * * * *